United States Patent [19]

Dekker

[11] 3,903,784

[45] Sept. 9, 1975

[54] SELF-COUNTERSINKING FASTENER HEAD

[75] Inventor: Charles Dekker, St. Charles, Ill.

[73] Assignee: Anchor Bolt and Screw Company, Chicago, Ill.

[22] Filed: Jan. 3, 1972

[21] Appl. No.: 215,071

[52] U.S. Cl. .................................................. 85/43
[51] Int. Cl.² ........................................ F16B 25/00
[58] Field of Search .......... 85/9, 28, 29, 41, 43, 44, 85/45, 53, 56, 1 JP; 151/37, 41.73

[56] References Cited
UNITED STATES PATENTS

| 112,935 | 3/1871 | Lipsey | 85/44 |
| 298,427 | 5/1884 | Stone | 85/43 |
| 466,463 | 1/1892 | Holland | 85/43 |
| 954,924 | 4/1910 | Brooks | 85/53 |
| 1,067,755 | 7/1913 | Price | 85/1 JP |
| 1,175,665 | 3/1916 | Sweet | 85/43 |
| 1,821,709 | 9/1931 | Hoerr et al. | 85/9 R |
| 1,827,628 | 10/1931 | Twedell | 85/9 R |
| 1,968,516 | 7/1934 | Dieter | 85/9 R |
| 2,056,688 | 10/1936 | Peterka et al. | 85/9 R |
| 2,556,155 | 6/1951 | Stellin | 85/45 |
| 2,833,325 | 5/1968 | Laisy | 85/45 |
| 3,305,987 | 2/1967 | Weaver | 151/41.73 |

FOREIGN PATENTS OR APPLICATIONS

| 12,277 | 5/1903 | United Kingdom | 85/9 R |
| 15,102 | 7/1906 | United Kingdom | 85/43 |
| 13,617 | 6/1909 | United Kingdom | 85/43 |

*Primary Examiner*—Marion Parsons, Jr.

[57] ABSTRACT

Hot or cold forging is used to manufacture self-countersinking threaded fastener heads, such as self-countersinking screw heads and the like, which, during manufacture, can be removed from the heading die by straight axial movement.

One aspect of the present invention involves the use of a relatively narrow included angle for the tapered underside of the head in combination with an axially extending sharp edge collar cutter originating at the periphery of the head.

Another aspect of the present invention involves providing elongated cutters and cutter reliefs along the tapered underside of the head. The cutter reliefs form cutter recesses with the cutting edges at the top thereof. The recesses are shaped so that respective imaginary lines extending axially downwardly from any point on the surface of the recess encounter no other portion of the fastener. Moreover, in this aspect of the invention the cutting edges slope in the opposite direction of the slope of the screw threads on the fastener.

2 Claims, 13 Drawing Figures

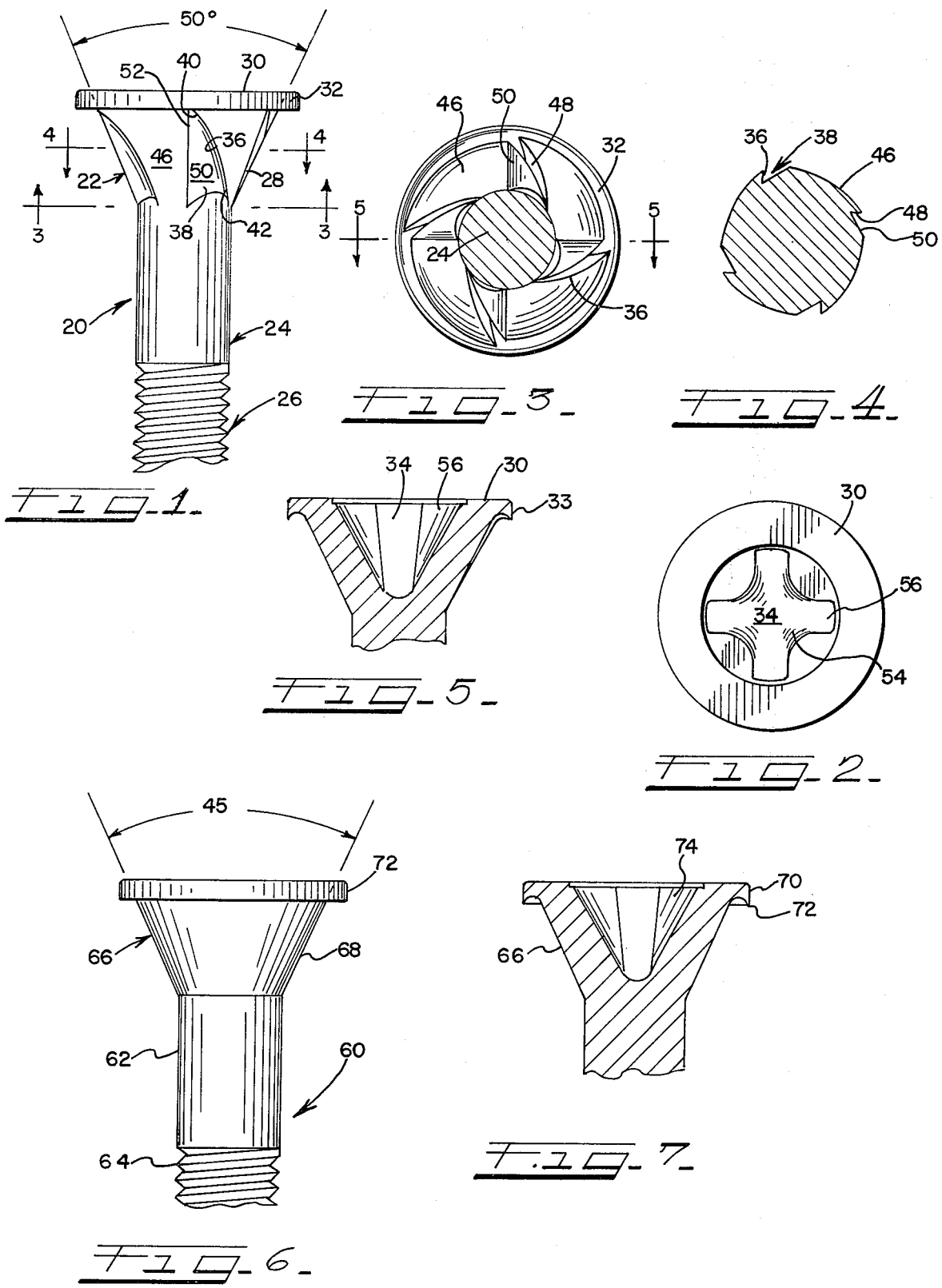

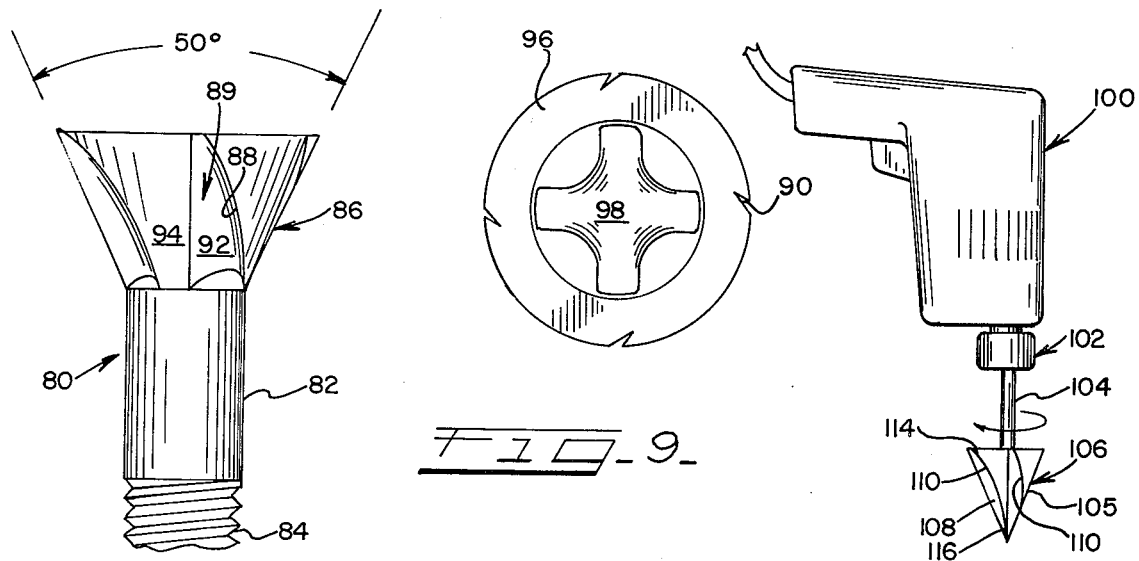
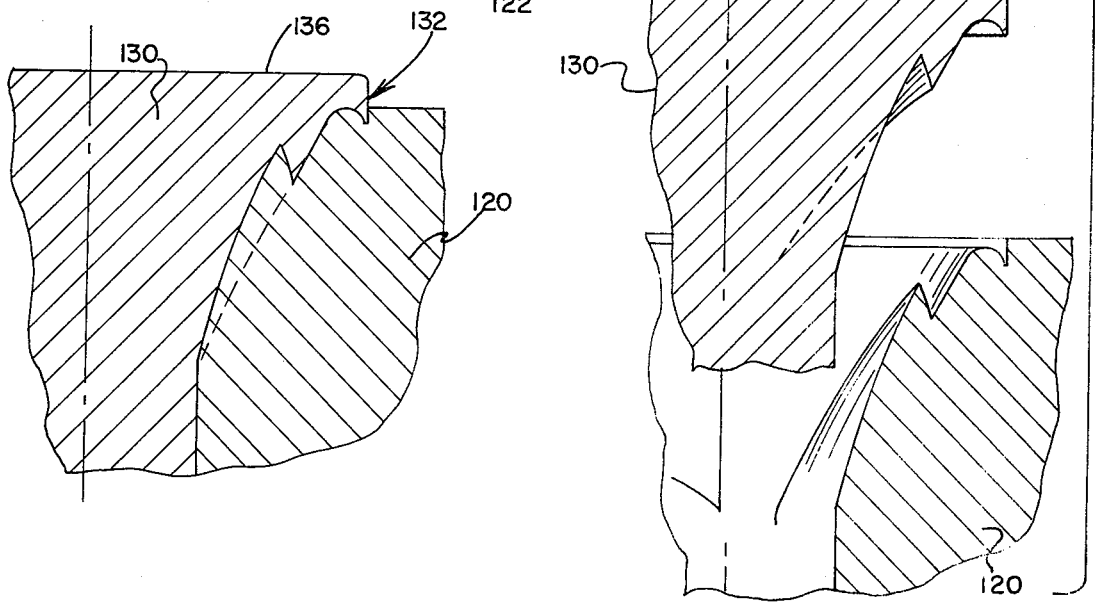

SELF-COUNTERSINKING FASTENER HEAD

This invention relates to self-countersinking threaded fasteners, and to the manufacture of said fasteners by hot or cold forging, such as for example, by the use of headers, or punch presses.

Many self-countersinking threaded fasteners, such as self-countersinking screws, and the like, have been suggested heretofore. However, these structures were relatively complex, and difficult or expensive to manufacture. Although the use of self-countersinking fastener heads would be highly desirable, the self-countersinking screws and the like which have been heretofore suggested have been relatively expensive due to the cost of manufacture. Because of what was heretofore believed to be absolutely essential design characteristic, it has been virtually impossible to manufacture the self-countersinking heads by highly desirable hot or cold forging operations.

Prior to my invention, it was believed necessary to provide self-countersinking fastener heads with at least some sloping cutters which either extend axially or slope steeply in the same direction as the screw threads. Because such a piece could only be made by an expensive manufacturing process and could not be formed in a forging operation unless either a rotatable die were used, or means were provided for rotating the piece to thread it out of the die, these self-countersinking screws never reached wide use or acceptance, and were never made widely available. By my invention, self-countersinking threaded fastener heads can now be manufactured in a process in which these fasteners can be produced commercially, namely by hot or cold forging.

Cold forging as practiced in cold heading, or punch press operations consists in forcing metal to flow cold into dies to form thicker sections and more or less intricate shapes. The operation is performed in widely used specialized machines where the metal, in the form of wire or bar stock, may be upset or headed in certain sections to a larger size. Cold heading was developed for the production of bolts, screws, rivets, and the like, and is now in widespread use in the manufacture of such fasteners. Some manufacturers use punch presses in the manufacture of these products. Upsetting, or heading by cold forging can be used to produce a great variety of bulbous shapes which are usually symmetrical about the longitudinal axis. Virtually any material that is malleable when cold can be used for cold forging. Such materials include carbon and alloy steel, stainless steel, copper and its alloys, aluminum and its alloys, monel metal and others, thereby providing a selection of materials for almost any service. Although a large portion of cold forged parts are given no heat treatment, they may be heated, quenched and tempered, providing suitable metals are used, thereby enhancing the mechanical properties. The finish of cold forged parts gives a bright, smooth and burnished appearance where heat treatments are not applied. Also, dimensional tolerances can be held very closely.

For these reasons, often cold forged parts can be used in the as-formed condition. Cold forged parts have unusually reliable high quality. Raw materials, such as wire, of suitable quality is ordinarily used, and such material has had special care in the steel mill. The shaping operation itself is also a 100% check against defects, since any serious defects in the material will become apparent visually during the upsetting operation. The strength of cold forged parts is enhanced by the cold working of the metal unless subsequent heat treatments are applied. Even when heat treatment is applied, the cold forged part is superior by reason of the directional flow of the metal. During the upsetting operation, the grain flow of the metal conforms to the contour of the part, resulting in the highest degree of reliability and resistance to shock and vibration. There is little if any waste of material in cold forging. In the as-formed condition waste may be virtually zero compared with the high losses incident to cutting parts of varying section from the solid.

Furthermore, cold forged parts are produced at very high speeds—from possibly 50 per minute for relatively large sizes to several hundred per minute for small sizes—all of which tends to make cold forging processes well suited for mass production, particularly for the production of bolts, screws, rivets and the like. Thus it would be highly desirable to provide a self-countersinking fastener which could be manufactured using conventional cold forging equipment.

Any product which can be cold forged can also be produced by the hot forging process which consists of forcing heated metal to flow into dies to form shapes with larger cross section areas than that of the original stock. In hot forging, the metal is soft enough to be upset directly into hexagonal or square shapes eliminating the additonal trimming operation. However, there is usually a flash left at the bottom of the head where the metal is squeezed out of the clearance between the hammer and the die and such flash must be sheared off in a subsequent operation. Generally, closer dimensional tolerances can be held in cold than in hot heading and a somewhat smoother finish, especially on the head, is obtained.

It would be highly desirable to provide a self-countersinking screw manufacturing method which utilizes a hot or cold forging operation. Although many threaded and helical plastic articles are produced in dies and are removed from these dies by rotating either the die or the plastic article, it is extremely important that the manufacturing process by which the heads of screws, and the like, are made should not require that the die or the formed piece be rotated to remove the article from the die. To be commercial, the manufacturing process must necessarily be simple and inexpensive, requiring highly reliable and long-lived tools.

It is an object of the present invention to provide self-countersinking screw heads which can be manufactured by hot or cold forging.

It is another object of the present invention to provide self-countersinking screw heads which are highly efficient, and which shape their own countersink recess into which their head is positioned.

It is another object of the present invention to provide a method for manufacturing self-countersinking screw heads which is readily adaptable to conventional hot or cold forming techniques, and by which the formed piece can be removed from the die by straight axial movement.

It is another object of an important aspect of the present invention to provide a self-countersinking screw which, when seated, tenaciously resists initiation of reverse rotation.

These and other objects which will be apparent hereinafter are all achieved in accordance with the present invention which is described in general and in connection with particularly preferred embodiments hereinafter, and with the aid of the accompanying drawings in which:

FIG. 1 is a fragmentary vertical view of a preferred embodiment of the present invention;

FIG. 2 is a top view of a fastener illustrated in FIG. 1;

FIG. 3 is a cross sectional view taken approximately along the line 3—3 of FIG. 1;

FIG. 4 is a cross sectional view taken approximately along the line 4—4 of FIG. 1;

FIG. 5 is a cross sectional view taken approximately along the line 5—5 of FIG. 3;

FIG. 6 is a vertical view of another preferred embodiment of the present invention;

FIG. 7 is a vertical mid-sectional view through the embodiment illustrated in FIG. 6;

FIG. 8 is a vertical view of an alternative embodiment of the present invention;

FIG. 9 is a top view of the embodiment shown in FIG. 8;

FIG. 10 is a side view of a hand tool utilizing a cutter which is designed in accordance with the principles of the present invention;

FIG. 11 is a diagrammatic fragmentary sectional view illustrating a cold heading process by which the self-countersinking heads of the present invention can be manufactured;

FIG. 12 is a diagrammatic cross sectional view similar to that shown in FIG. 11 showing the condition of the formed piece in the die immediately prior to removal therefrom; and FIG. 13 is a fragmentary cross sectional diagrammatic view showing the formed piece partically removed from the die after it has been formed as illustrated in FIG. 12.

In FIG. 1 a self-countersinking screw in accordance with the present invention is generally indicated at 20. Screw 20 comprises a head portion 22, a shank portion 24 and a threaded end portion 26. In the embodiment illustrated in FIG. 1 threaded portion 26 provides a "right-handed" screw thread and consequently the slope of the threads as viewed in FIG. 1 is in the generally upward direction from left to right.

As a basis for the directional terms used herein, the direction from head 22 toward threaded end 26 will be referred to as a downward direction.

Head 22 includes an outwardly tapering portion 28 and top end portion 30. Top end portion 30 includes a radially extending flange portion 32 which has a sharp edge annular cutter 33 extending axially downwardly from the periphery thereof. Extending downwardly into end 30 is a centered Phillips driving recess 34.

In the embodiment illustrated in FIGS. 1-5, four substantially identical cutters 36 are provided along the outwardly tapering portion 28. Immediately preceding each cutter 36 is a respective cutter recess 38.

It is noted that cutters 36 are steeply sloping, and they slope in a direction which is opposite to the direction of the slope of screw threads 26. Thus as the fastener 20 is rotated in the advancing direction, upper end 40 of a cutter 36 preceeds the lower end 42 of that respective cutter.

Behind each cutter 36 and between each adjacent pair of cutters 36 is a relief 46 in the tapered portion 28 of fastener 20.

The upper surface of cutter recess 38 is referred to as a rake angle relief and is identified (FIGS. 3 and 4) by the numeral 48, and the lower surface of the cutter recess which is immediately adjacent to the rake angle relief 48 is identified by the numeral 50. Respective surfaces 46, 48 and 59 may be considered as the walls of each respective cutter recess 38.

It is noted that the radius of any point on cutting edge 36 is equal to or greater than the radius of any other point in its same horizontal plane, i.e. in a plane perpendicular to the longitudinal axis. This relationship is necessary for efficient operation of cutter 36. Moreover, in accordance with this invention each cutter 36 slopes in a direction which is opposite to the slope of driving threads 36. The angle of inclination or "pitch" of the cutter is substantially greater than the pitch of driving threads 26. Cutter 36 can proceed around tapered underside 28 of head 22 as a helix on a substantially frusto-conical structure.

Another relationship in the preferred embodiment of the invention illustrated in FIGS. 1–5 relates to the character of relief surfaces 46, 48 and 50. Because of the reverse slope of cutters 36 (i.e. they slope in the opposite direction of the slope of screw threads 26), the undersurface or rake angle cutting relief 48 is at the top of recess 38 and is axially accessible from the bottom end of the fastener 20 (see FIG. 3). Also, every portion of recess 38, that is, surfaces 46, 48, and 50, are so shaped that lines extending axially downwardly from every point on these surfaces encounter no other portion of fastener 20 (see FIG. 3). In the preferred illustrated embodiment, the line of demarcation 52 which borders relieved surfaces 50 from tapered relief surface 46 extends in a direction such that line 52 is vertical or the slope of line 52 is in the same direction as the slope of the driving threads. However the presence of such a line of demarcation 52 is not an essential feature of the illustrated embodiment, and it is only necessary that lines extending axially downwardly from every point on surfaces 46, 48 and 50 encounter no other portion of fastener 20; and relief surfaces 46 and 50 can be merged into a single relief. On the other hand, surface 46 can be made up of a portion of a frusto-conical surface having only radii in each plane perpendicular on the axis of the fastener which are equal to the radius of the cutting edge 36. In the latter instance, relief surfaces 48 and 50 constitute the walls of relief recess 38.

Driving socket 34 includes a central portion 54 and four radially outwardly extending regions 56. It is noted that in the preferred illustrated embodiment regions 56 of the driving sockets 34 extend into that portion of tapered head 22 which are bounded radially outwardly by reliefs 46.

It is noted that the included angle of the generally tapered underside of head 22 as taken along cutting edges 36 is approximately 50°.

Another important aspect of the present invention is illustrated in FIGS. 6 and 7. Another self-countersinking fastener in accordance with the present invention is generally indicated at 60 and includes an unthreaded shank protion 62, a threaded body portion 64, and a head portion generally indicated at 66.

In the embodiment illustrated in FIGS. 6 and 7 the underside 68 of tapered head 66 is smooth and has an included angle of about 45 °. In this aspect of the invention, a self-countersinking head is provided which includes the peripheral axially extending annular cutter in combination with a tapered underside having a relatively small included angle, that is, less than 60°, preferably between 45° and 55°.

Head 66 includes a radially extending flange portion 70 which extends axially downwardly at its periphery to provide a sharp edge axially extending cutter collar 72. A Phillips recess 74 similar to recess 34, which was shown and discussed in connection with FIGS. 1–5, is provided in head 66.

An alternative embodiment of the present invention is illustrated in FIGS. 8–9. In FIG. 8 a self-countersinking fastener is generally indicated by the numeral 80 and includes an unthreaded shank portion 82, a threaded body portion 84 and a tapered head portion generally indicated by the numeral 86. In this embodiment the included angle of the tapered head portion is approximately 50°. In this embodiment cutters 88, and cutter relief recesses 89, similar to those described and discussed in detail in connection with FIG. 1 are provided. It is necessary that the cutters 88 and the cutter relief recesses 89 comprising the upper rake angled reliefs 90 and lower reliefs 92 and adjacent facing reliefs 94, all meet the same requirements discussed in connection with cutters 36, surfaces 46, 48, and 50. In the embodiment illustrated in FIG. 8, however, no radially extending flange portion is included and cutter relief recesses 89 extend through end 96 of head 86. Again, a Phillips driving socket 98 is provided at top 96.

FIG. 10 illustrates the application of the principles of this invention which were disclosed hereinbefore to the manufacture of a cutting tool designed for creating countersink holes, for example. In FIG. 10 a power driver is generally indicated at 100 and includes connecting means 102, shaft 104 and cutter 106. The working end 105 of cutter 106 is similar in design to the tapered underside 28 of head 22 of fastener 20. Thus, in accordance with the present invention, a plurality of cutter relief recesses 108 precede a plurality of respective cutting edges 110 in tool 106 in the work-facing outward tapered surfaces 105. Again, each cutting edge 114 slopes in the direction such that its upper end 114 of cutting edges 110 precede the lower ends 116 as the tool 106 rotates in the operating direction. Thus, tool 106 can be manufactured by conventional cold heading techniques and during manufacture can be removed from the heading die by a straight axial movement therefrom, that is without rotating either the piece, or the die.

FIG. 11, 12 and 13 illustrate the cold forging method by which the self-countersinking fastener of the present invention can be manufactured commercially. It illustrates the steps involved and the equipment employed. FIG. 11 illustrates the relationship between die 120, wire segment 122 and hammer 124 at the onset of the cold forging operation. Equipment in which the axes of these elements extend vertically is sometimes referred to as a punch press, and that in which the axis extends horizontally is called a header. Wire 122 is positoned within die 120 with an extending portion 128 providing the metal which is eventually displaced or upset to form the self-countersinking head of this invention. I have found that two impacts by a hammer 124 can shape wire 128 to conform to die 120 as indicated in FIG. 12. As indicated in FIG. 12 newly formed head 130 conforms to the shaping surfaces of die 120 with the exception that part of peripheral edge 132 of flange 136 extends out of die 120 and is unconfined at its periphery. This non-confinement of portion 132 provides a cushion by which direct contact between hammer 124 and die 120 is avoided, thus contributing to the long life of the tools, 120, 124. It will be appreciated from a consideration of FIG. 12, and the mating configurations of shaped head 130 and die 120, that head 130 can be moved axially (upwardly as shown in FIG. 13) out of die 120 without turning or rotating either head 130 or die 120 to separate the newly formed article using straight axial push.

In the aspect of the invention described in connection with FIGS. 6 and 7, the provision of radially extending flange 70 with the axially extending annular cutter 72 is an essential part of the overall combination. However, as indicated above, another important aspect of this invention is illustrated in FIGS. 1–5, and 8–9, and the use of the radially extending flange 32 and/or axially extending annular cutter 33 is not absolutely essential in accordance with this important aspect of the invention. Nonetheless, the provision of flange portion 32 is preferred even in this aspect, since, in addition to serving as a cushion to keep the die and hammer from directly contacting each other during forging, the presence of this flange portion 32 on the threaded fastener increases the required seating torque and thereby provides greater countersink depth control and reproduceability. In this aspect of the invention the axially extending annular cutter can be omitted entirely. Nonetheless it is preferred that it be provided, at least to the extent that a vestige is present, since it is believed that this annular cutter helps to prevent splitting of the wood.

It is contemplated that the self-countersinking fasteners of the present invention would normally be driven by commercially available electric or pneumatic drivers. These drivers are conventionally provided with some mechanism whereby the driving action is disengaged when a predetermined seating torque is reached. The momentum of the driver would normally cause the fastener in accordance with this aspect of the invention to tend to continue to rotate beyond the desirable depth of countersink if some means such as the flange were not provided. The flange 32 is believed to increase the required seating torque to such an extent that it dissipates the drivers' momentum when the fastener flange 32 engages the wood. By providing at least some radially extending portion corresponding to flange 32, the countersink depths are reproduceably controlled when driven by the commercially available torque adjustable electric or pneumatic drivers referred to above.

For example, in the installation of oak flooring during the manufacture of a large freight hauling trailer, self-countersinking fasteners in accordance with the present invention were screwed into pre-drilled holes which extended through 1⅛ inches. thich oak board and 3/16 inch thick section of steel. The self-countersinking fastener was a 5/16, 18 × 2¼ Phillips recess fastener with self-tapping threads at the end of its body, and otherwise as described in connection with FIGS. 1–5 herein. The diameter of flange 32 was approximately 5/8 inch and cutter 33 extended 1/64 inch axially downwardly. After adjusting the torque release setting on the power driver, these fasteners were countersunk reproduceably with top 30 at a depth of ⅛ inch below the oak board surface. This depth was preferred by that particular trailer manufacturer. Other settings of the drivers' torque control reproduceably seated the fasteners at depths up to ½ inch without splitting the wood. The countersink depth selected for a particular installation is believed to be a matter of preference, and in the case of freight hauling trailers is usually provided to allow for some floor wear before the heads of the fasteners are reached.

Moreover, when self-countersinking heads in accordance with the important aspects of the present invention illustrated in FIGS. 1–5 and 8–9 are used, these fasteners tenaciously resist initiation of reverse turning, once seated. For example, when the self-countersink fasteners described immediately above in the specific example were seated using a torque not exceeding 200 inch pounds, a torque of about 180 inch pounds was required to initiate rotation in the reverse direction. For comparison, when ordinary countersink fasteners were seated using 200 inch pound torque, only between about 60 and 80 inch pounds torque was required to initate rotation in the reverse direction. Thus, the aspect of the present invention which utilizes the reverse slope cutters on the tapered underside of the head provide an additional advantage of tenaciously resisting initiation of rotation in the reverse direction, once seated.

I believe that providing the reverse slope cutters 36, 88 utilized in the aspect of the invention which is described in FIG. 1–5 and 8–9 is diametrically opposite to what was believed necessary according to the theories advanced heretofore, namely that grooves or flutes extending axially or sloping in the same direction as the screw threads are essential for self-countersinking fasteners. It might appear that the reverse slope cutters 36, 88 of this invention would force the dislodged material, such as wood cuttings, and the like, downwardly under the advancing head. However, during actual use of self-countersinking heads with reverse slope cutters of this invention to secure oak boards as described above, I have observed that dislodged wood particles fly radially outwardly from the recesses 38 away from fastener 20 until 32 is seated. Once flange 28 contacts the surface of the wood, self-countersinking screw head continues to bury itself in the wood and no dislodged material appears above the head.

The countersunk hole which is formed by the operation of each of the aspects of the present invention is neat and clean and minimal or no damage to the surrounding surface is observed.

Although four cutters 36, 88 were shown in the embodiments of FIGS. 1 and 8, the invention is not so limited and the use of two to eight cutters 36, 88 is preferred. Also a Phillips recess is shown for the purpose of illustration only and other configurations can be used for accomodating other types of drivers. However, the illustrated use of four cutters 36, 88 in combination with the Phillips driver socket is particularly preferred because the driving forces are uniformly distributed on the cutters 36, 88. Variations and modifications can be made without departing from the spirit and scope of the invention which is to be defined by the claims appended hereto.

Thus, the present invention provides highly satisfactory and efficient self-countersinking threaded fastener heads which can be produced in a manufacturing process using conventional hot or cold forging equipment. Other supplemental conventional manufacturing processing can be used, if desired. For example, self-tapping fasteners can be case hardened, and this accrues to the benefit of the heads used in the present invention. However since self-countersinking heads are ordinarily used only once, case hardening is not essential. Likewise, during the manufacturing process, conventional die lubricants can be used if desired, although I have produced the fasteners of this invention in cold forging equipment without lubricant. My invention, in making it possible to manufacture self-countersinking fastener heads in conventional forging equipment, and using conventional manufacturing processing, makes self-countersinking threaded fastener heads a commercial practicality.

I claim:

1. A self-countersinking threaded fastener comprising:
   a threaded elongated body portion with screw threads sloping in a first direction;
   a head portion including a tapered underside having an included angle between 45° and 55°, and four uniformly spaced cutter edges sloping in the direction opposite said first direction, and a recess below each of said cutter edges having a shape such that respective imaginary lines extending axially downwardly from every point on said recess encounter no other portion of said fastener, and driving means comprising a recess in the top of said head portion having four radially extending portions extending into said head portion to respective ones of those regions of the tapered underside of the head which are positioned between said cutting edges.

2. A fastener as defined in claim 1 wherein said included angle is approximately 50°.

* * * * *